United States Patent [19]

Evans et al.

[11] Patent Number: 4,680,211
[45] Date of Patent: Jul. 14, 1987

[54] RECORDING DISKS

[75] Inventors: Thomas E. Evans; Christine M. Bowen, both of Midland, Mich.

[73] Assignee: The Dow Chemical Company, Midland, Mich.

[21] Appl. No.: 758,904

[22] Filed: Jul. 25, 1985

[51] Int. Cl.⁴ .............................................. B32B 3/02
[52] U.S. Cl. .................................... 428/65; 369/288; 346/137; 428/64; 430/270
[58] Field of Search ...................... 369/286, 284, 288; 346/135.1, 137; 428/64, 65; 430/270

[56] References Cited

U.S. PATENT DOCUMENTS 3,646,533  2/1972  Rosenblum .
4,376,963  3/1983  Knoop et al. .
4,415,942 11/1983  Frosch et al. .
4,510,593  4/1985  Daniels .

FOREIGN PATENT DOCUMENTS 87165    8/1983  European Pat. Off. .
3248601  7/1984  Fed. Rep. of Germany .
58-129009 8/1983  Japan .
58-166550 10/1983 Japan .

Primary Examiner—Alexander S. Thomas

[57] ABSTRACT

A recording disk for either optical or magnetic recording having improved dimensional stability as a result of reduced water absorption comprising a copolymer of a vinyl aromatic monomer and alphamethylstyrene prepared by anionic polymerization at a temperature above 61° C.

8 Claims, 1 Drawing Figure

4,680,211

RECORDING DISKS

BACKGROUND OF THE INVENTION

The present invention relates to recording disks. More particularly, the present invention relates to circular recording disks of exceptional flatness made of a thermoplastic resin and used for the storage of data or electronic signals in magnetic or optical form.

Recording disks such as hard disks used in the magnetic storage and retrieval of computerized information, or laser disks employing a laser light means for the retrieval of prerecorded data and information are called upon to possess ever increasing levels of performance. In view of the high level of integrity required of data files retained in the form of recording disks, there is a need for continued improvement in presently available recording disks.

Moreover, such recording disks especially laser disks must possess sufficient physical properties to resist warpage and dimensional variation when exposed to differences of humidity and temperature as well as to resist vibration or flutter due to physical stress and strain during operation. Presently available thermoplastic recording disks are easily and economically fabricated by injection molding the respective parts from thermoplastic resins, however, such recording disks may be deficient in one or more physical properties.

Suitable thermoplastic resins for use in the preparation of recording disks must possess acceptable properties of heat distortion, modulus of elasticity, and dimensional stability. A suitable resin should also possess low water absorption when exposed to elevated levels of humidity. It is believed that polymer dimensional change may result upon absorption of water vapor. Additionally it is desirable to reduce contact of water with the recording layer to prevent deterioration thereof. Resins for use in components of optical disks must further be capable of preparing moldings having suitable birefringence values so that the light beam employed in reading recorded information is not adversely affected by portions of the disk through which it passes. To satisfy this latter requirement the resin must possess suitable properties to allow for the formation of molded parts having low molded in stress. Only by successfully possessing low molded in stress are optical recording disks with suitable optical properties prepared.

Optical disks normally contain several layers in axial alignment. One such layer is a substrate layer which imparts physical integrity to the structure. Next there may be provided a recording layer such as a vacuum deposited reflective metal layer. The substrate may be pitted or etched to provide necessary surface irregularities corresponding to the recorded information while the recording layer provides a method for reading or retrieving such information. In some constructions there is additionally provided an optically transparent cover such as a solid film which is physically attached to the substrate layer substantially coextensively therewith at the circumference and axis. Generally, a covered structure has greater strength than an uncovered structure, however, additional steps in assembly of covered laser disk are required.

In either a covered or uncovered design single or double sided disks may be provided. A particularly advantageous design comprises two axially aligned halves, each half comprising a substrate layer and recording layer, arranged such that the recording layers are disposed in contact with each other in the center of the structure. The resulting structure has recording layers that are protected by outwardly facing substrate layers and does not require separately prepared covers.

In either covered or coverless designs it is critical that the thermoplastic resin employed possess extremely high dimensional stability to avoid buckling or wrinkling of the resulting structure. Particularly for larger diameter disks of extremely thin cross-sectional dimension such stability is important. For example, it is believed that thermoplastic recording disks possessing commercially suitable physical properties and having a diameter greater than 8 inch (200 mm) and a thickness less than about 0.12 inch (3.0 mm) and especially less than about 0.10 inch (2.5 mm) have been previously unattainable.

It would be desirable to provide an improved recording disk demonstrating greater reliability. In addition, it would be desirable to provide a laser or magnetic recording disk comprising a thermoplastic polymer demonstrating improved stability and reliability due to increased dimensional stability and reduced moisture absorption.

SUMMARY OF THE INVENTION

According to the present invention, there is now provided an improved recording disk comprising a copolymer of at least one vinyl aromatic monomer and alpha-methylstyrene prepared by anionically polymerizing the vinyl aromatic monomer and alpha-methylstyrene at a temperature greater than about 61° C. and less than the ceiling temperature of the vinyl aromatic monomer.

In a preferred embodiment, the above recording disk has a diameter of at least about 8 inches (200 mm) and a cross-sectional dimension in the axial direction (thickness) of less than about 0.12 inch (3.0 mm).

In a most preferred embodiment there is provided an improved optical disk comprising a thermoplastic resin having diameter greater than about 8 inches (200 mm) and thickness less than about 0.12 inch (3.0 mm).

DETAILED DESCRIPTION OF THE INVENTION

Figure 1:
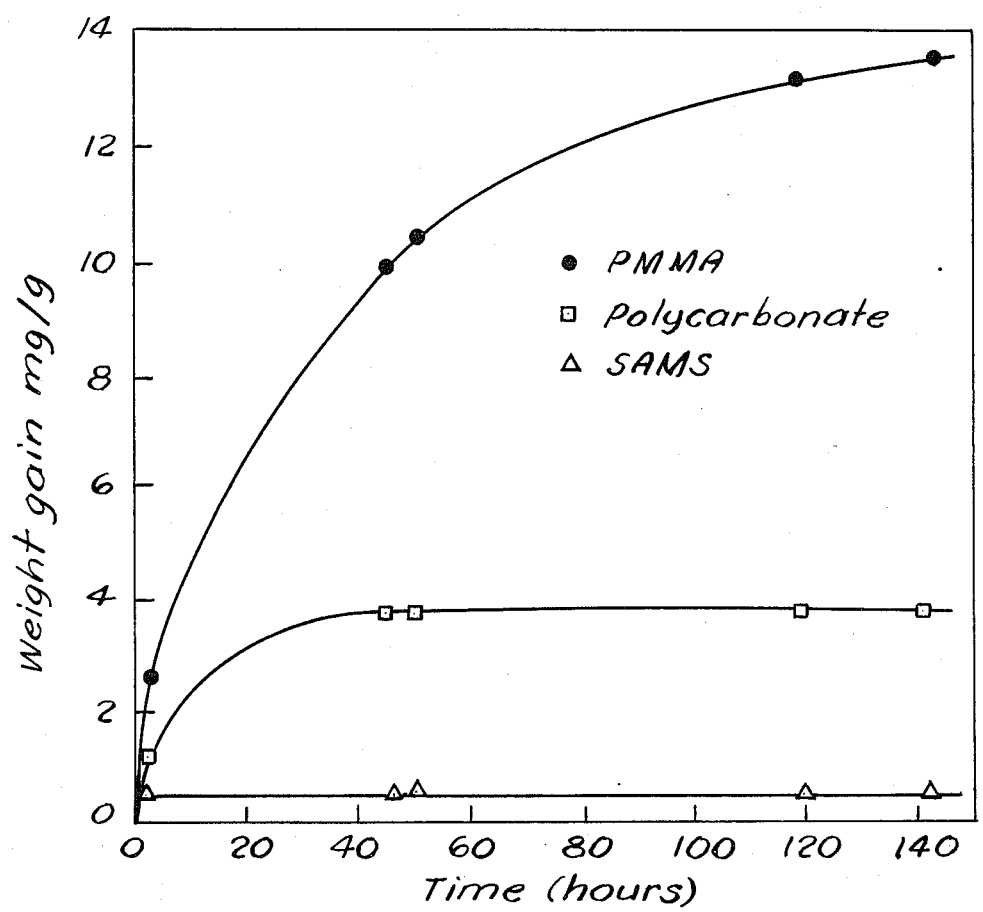
FIG. 1 depicts weight gain as a function of time for three thermoplastic resins exposed to water vapor under conditions described in Example 5.

The vinyl aromatic monomers employed to prepare the copolymers used in the present invention include styrene and ring alkyl substituted styrene compounds containing up to about four $C_{1-4}$ alkyl substituents. Examples include styrene, 2-vinyl toluene, 3-vinyl toluene, 4-vinyl toluene, t-butyl styrene, etc., as well as mixtures of such vinyl aromatic monomers. A preferred vinyl aromatic monomer is styrene.

The copolymers employed in the present invention are prepared by anionic polymerization. Where a feed stream is employed containing high amounts of alpha-methylstyrene, the styrene alpha-methylstyrene copolymers prepared according to the present invention contains nearly the theoretical maximum amount of alpha-methylstyrene, i.e. a ratio of nearly two alpha-methylstyrene units for each vinyl aromatic monomer unit. In the styrene/alpha-methylstyrene system this molar ratio of $\frac{2}{3}$ alpha-methylstyrene results in a weight percent of alpha-methylstyrene of approximately 70. Additional amounts of alpha-methylstyrene are not believed to be incorporated under the polymerization conditions chosen due to the thermodynamically favored formation of two repeating monomer units in the polymer chaim during the reaction. Accordingly, it may be seen that generally no more than two alpha-methylstyrene monomer units are located adjacent to one another in the resulting polymer. Of course, reduced amounts of alpha-methylstyrene may be employed if desired resulting in a random copolymer containing a statistical distribution of vinyl aromatic monomer and alpha-methylstyrene monomer units less than the above maximum alpha-methylstyrene content. The copolymers of the present invention are further characterized by a random distribution of vinyl aromatic monomer remnants and alpha-methylstyrene remnants.

Preferably, the copolymers, employed in the present invention contain at least about 5 percent alpha-methylstyrene units by weight and preferably, at least about 20 percent alpha-methylstyrene units by weight. The weight average molecular weight of the copolymers is at least about 40,000 and preferably at least about 100,000. In determination of molecular weights of the copolymers used herein the technique of size exclusion chromatography is employed and the value obtained is a comparative value to that of a polystyrene molecule that would occupy the same volume as that of the polymer molecule being measured. The resulting copolymers are stable at elevated temperature conditions and demonstrate good heat distortion properties.

The term "ceiling temperature" employed herein means the temperature above which the polymerization of the alpha-methylstyrene to form high molecular weight homopolymers is thermodynamically disfavored compared to the reverse depolymerization process. However, it has now been discovered, that alpha-methylstyrene which has a homopolymerization ceiling temperature of about 61° C., will form oligomeric reaction products, especially and even essentially the dimer thereof under anionic polymerization conditions at a temperature above 61° C. Other monomers usually possess ceiling temperatures that are higher than 61° C. Styrene in particular has a homopolymerization ceiling temperature of about 350° C. Thus, thermodynamically stable copolymers of vinyl aromatic monomers and alpha-methylstyrene are formed under anionic polymerization conditions at a temperature above about 61° C. comprising in general no more than two adjacent alpha-methylstyrene polymerization moieties.

The anionic polymerization may be initiated by use of an organometallic anionic polymerization initiating compound according to well-known techniques. Suitable organometallic anionic polymerization initiating compounds are previously known and disclosed in the art. Such known compounds include the alkyl lithiums and other alkali metal derivatives of aromatic or aliphatic compounds. A preferred initiator is n-butyllithium.

In the polymerization, the initiator is added to an anionically polymerizable monomer mixture retained under polymerization conditions. Suitably, a back mixed reactor such as a stirred tank reactor may be employed and the monomers continuously added to the reactor and the reaction mixture discharged from the reactor at about the same rate as the monomers are added. Alternatively, a continuously recirculated coil back mixed reactor may be employed or additional reactors employed as are known in the art. In practice, an upper temperature limit on the polymerization is around 200° C.

As is previously known, monomers for use in anionic polymerizations may be first purified by suitable purification means such as by distillation, the use of molecular sieve beds, etc., in order to remove contaminants that would interfere with the initiator. Alternatively, aluminum alkyl scavenging agents such as those disclosed in U.S. Pat. No. 4,239,870, may be employed in order to purify the ingredients of the polymerization mixture. The highly purified monomers along with an inert solvent, if desired, are then charged to a reaction vessel and the reactor sealed and heated to a temperature above the ceiling temperature of alpha-methylstyrene. Suitable solvents are those previously known in the art exemplified by cyclohexane, benzene, ethylbenzene, toluene, etc. In a desirable operating embodiment, an excess of alpha-methylstyrene may be employed. In as much as the excess alpha-methylstyrene is not incorporated into the final copolymer, due to the aforementioned limitation imposed by the ceiling temperature, the same acts as the solvent for the reaction process. A preferred reaction mixture comprises on a weight basis from about 50 percent to about 99.5 percent alpha-methylstyrene and from about 50 percent to about 0.5 percent vinyl aromatic monomer.

The copolymer may be recovered from the reactor effluent by terminating the polymerization through addition of a chain terminating agent such as an alcohol and devolatization or precipitation of the resulting syrup.

The previously described copolymer resin may be employed in either the substrate or cover of a recording disk of the present invention. Such components may be prepared by known techniques of injection molding at melt temperatures from about 525°–590° F. (274°–310° C.) and mold temperatures of 160°–190° F. (71°–88° C.). The recording disks of the invention are not intended to be limited to any particular construction or arrangement of the respective components.

The recording disks of the invention are characterized by having exceptional flatness as well as good strength and dimensional stability when exposed to a wide range of temperature and relative humidity values.

SPECIFIC EMBODIMENTS

The following examples are provided to more particularly describe the present invention and are not to be construed as limiting.

EXAMPLE 1

Copolymers of styrene and alpha-methylstyrene are prepared by anionic polymerization substantially according to the following process steps. A feed stream comprising alpha-methylstyrene, phenylacetylene free styrene and ethylbenzene solvent is distilled and contacted with an alumina bed to remove water, oxygen and benzaldehyde impurities. The purified feed stream is pumped to a 2-liter Paar reactor, equipped with a hollow auger agitator, the hollow auger comprising a cylinder slightly shorter in length than the interior of the reactor and slightly smaller in diameter. A land is helically disposed on the outside of the cylinder. The land is sized such that the cylinder generated by rotation of the hollow cylinder and land is slightly less than the internal volume of the reactor. Such an agitator is described in U.S. Pat. No. 4,239,863, the teachings of which are herewith incorporated by reference thereto.

Hot water under pressure is employed to heat the reactor to 95° C. The purified feed stream and initiator are introduced into the side of the reactor at a rate to give a two-hour residence time. The initiator is normal-butyllithium pumped at a rate to provide a concentration of about 60 ppm. The pressure within the reactor is maintained at about 50 pounds per square inch gauge using a pressure control valve at the outlet. The stream from the reactor is fed to a terminator coil of 1 inch inside diameter, 316 Stainless Steel tubing connected in a square configuration and having an internal volume of about 467 cubic centimeters. Material is recirculated within the terminator coil while a solution of 1 weight percent ethanol in ethylbenzene is fed to the terminator coil at a rate about twice that of the normal-butyllithium fed to the polymerizing vessel. Effluent from the terminator coil is then pressure fed into a devolatilizer equipped with a flat plate heater and a screw extruder substantially according to that described in U.S. Pat. No. 3,014,702, the teaching of which is incorporated by reference thereto. The exterior of the heater is maintained at a pressure of less than 20 millimeters of mercury and the product mixture is heated to a temperature of about 250° C. to provide a polymer containing about 0.3 weight percent volatiles. The molecular weight of the resultant styrene alpha-methylstyrene polymer over a 24-hour period is maintained at plus or minus 5,000 of 140,000. By varying the amount of alpha-methylstyrene in the monomer feed the amount of alpha-methylstyrene in the resulting copolymer may be varied up to a maximum content of about 70 percent by weight.

EXAMPLE 2

A flat disk is prepared by compression molding copolymers of styrene and alpha-methylstyrene prepared substantially according to the provisions of Example 1. The disks have a thickness of approximately 2 mm and a diameter of approximately 300 mm. Molding conditions include a molding temperature of 230° C., ten second mold warmup period and a two second mold time. The molded disks are slowly cooled over approximately 3 hours to a temperature of 90° C. The completed disks are removed from the mold and tested for physical properties.

Absorption spectra of the molded disks indicate no significant absorption at wavelengths from 320 to 1,100 nm.

Birefringence values of the molded samples are measured by use of null elipsometry with a laser tuned to a frequency of 6,328 Å. Results of the testing indicate birefringence values of $10^{-7}$ are achieved.

EXAMPLE 3

Comparison of Physical Properties

Physical properties of various test bars prepared from polymethylmethacrylate (PMMA) (DELPET ®623M), copolymers of styrene and alpha-methylstyrene (SAMS) containing 20 percent and 50 percent respectively of alpha-methylstyrene, and polycarbonate optical grade are prepared and tested according to accepted ASTM testing methods. Results are contained in Table 1.

TABLE 1

| Property | Test | PMMA | SAMS 20 | SAMS 50 | Polycarbonate |
| --- | --- | --- | --- | --- | --- |
| Vicat Softening Point (°C.) | ASTM D-1525 | 104 | 115 | 135 | 154 |
| DTUL (°C.) (264 psi stress unanneal 3.125 mm thickness) | ASTM D-648 | 94 | 102 | 108 | 132 |
| Coefficient of Linear Thermal Expansion (in/in °F.) | ASTM D-696 | $3.6 \times 10^{-5}$ | $3.5 \times 10^{-5}$ | $305 \times 10^{-5}$ | $3.8 \times 10^{-5}$ |
| Water Absorption (%) | ASTM D-570 | 0.3 | 0.03 | 0.03 | 0.15 |
| Refractive Index N(D) | ASTM D-542 | 1.491 | 1.592 | 1.595 | 1.586 |
| Transmittance (%) | ASTM D-1063 | 93 | 90 | 90 | 89 |
| Haze (%) | ASTM D-1003 | 0.3 | 0.9 | 0.6 | 1.5 |
| Flexural Modulus (psi) | ASTM D-790 | 471,000 | — | 560,000 | 340,000 |
| Tensil Modulus (psi) | ASTM D-638 | — | 550,000 | 550,000 | 345,000 |

EXAMPLE 4

The exceptional ability of SAMS to produce flat injection molded articles is demonstrated by preparation of sample injection molded disks. The disks have a thickness of 1.2 mm and a diameter of approximately 130 mm. Molding conditions include a melt temperature of approximately 550° F. (288° C.), cycle time of approximately 15 seconds and mold temperature of approximately 180° F. (82° C.).

Similarly flat injection molded disks are prepared having a thickness of 1.5 mm and a diameter of approximately 300 mm. Molding conditions include a melt temperature of approximately 500° F. (260° C.) and mold temperature of approximately 160° F. (71° C.).

EXAMPLE 5

In order to compare the hygroscopic properties of PMMA, polycarbonate and SAMS injection molded samples of the polymer are dried at 50° C. for 24 hours and exposed to conditions of 82 percent relative humidity and 60° C. over a period of about 150 hours. Measurement of weight gain in milligrams per gram of sample indicate the amount of water absorbed by the various samples. Results are contained in FIG. 1. It may be seen that polymethylmethacrylate and polycarbonate resins absorb greater amounts of water than do SAMS resins in the indicated time period. The reduced water absorption of the present recording disks is believed to result in reduced polymer swelling thereby achieving greater dimensional stability. Furthermore, chemical effects attributable to the presence of water, particularly the degradation of other components of the recording disk, may be avoided by use of recording disks of the present invention.

What is claimed is:

1. A recording disk adapted for the magnetic or optical recording or retrieval of information comprising a copolymer of at least one vinyl aromatic monomer and alpha-methylstyrene prepared by anionically polymerizing the vinyl aromatic monomer and alpha-methylstyrene at a temperature greater than about 61° C. and less than the ceiling temperature of the vinyl aromatic monomer.

2. The recording disk of claim 1 which is a optical disk.

3. The recording disks of claim 1 comprising one or more layers of a thermoplastic at least one of which layers comprises a copolymer of a vinyl aromatic monomer and alpha-methylstyrene prepared by anionically polymerizing the vinyl aromatic monomer and alpha-methylstyrene at a temperature greater than about 61° C. and less than the ceiling temperature of the vinyl aromatic monomer.

4. A recording disk according to claim 1, wherein the vinyl aromatic monomer is styrene.

5. A recording disk according to claim 1, wherein the copolymer has a molecular weight of at least 40,000.

6. A recording disk according to claim 1, wherein the copolymer comprises from about 5 percent to about 70 percent alpha-methylstyrene.

7. A recording disk according to claim 6, wherein the copolymer comprises at least about 20 percent alpha-methylstyrene.

8. A recording disk according to claim 1 having a diameter of at least about 8 inches (200 mm) and a thickness less than about 0.12 inch (3.0 mm).

* * * * *